(12) United States Patent
Romano

(10) Patent No.: US 11,112,619 B1
(45) Date of Patent: Sep. 7, 2021

(54) EYEWEAR WITH COOLING FRAME

(71) Applicant: Roy Romano, Alvin, TX (US)

(72) Inventor: Roy Romano, Alvin, TX (US)

(*) Notice: Subject to any disclaimer, the term of this patent is extended or adjusted under 35 U.S.C. 154(b) by 0 days.

(21) Appl. No.: 16/402,577

(22) Filed: May 3, 2019

(51) Int. Cl.
*G02C 5/00* (2006.01)
*G02B 1/18* (2015.01)
*G02C 5/14* (2006.01)

(52) U.S. Cl.
CPC ............... *G02C 5/008* (2013.01); *G02B 1/18* (2015.01); *G02C 5/14* (2013.01)

(58) Field of Classification Search
CPC . G02C 11/08; G02C 5/16; G02C 5/18; G02C 5/20; G02C 1/00; G02C 5/00
USPC ..................... 351/111, 158, 41, 62
See application file for complete search history.

(56) References Cited

U.S. PATENT DOCUMENTS

| | | |
|---|---|---|
| 7,231,922 B2 | 6/2007 | Davison et al. |
| 7,300,151 B2 | 11/2007 | Yee |
| 7,448,749 B2 | 11/2008 | Tu |
| 7,648,234 B2 | 1/2010 | Welchel et al. |
| 8,226,228 B2 | 7/2012 | Shantha et al. |
| 8,485,658 B2 | 7/2013 | Muller |
| 9,551,882 B2 | 1/2017 | Read et al. |
| 9,740,023 B1 * | 8/2017 | Ashwood ............ G02C 5/14 |
| 2014/0025144 A1 | 1/2014 | Ragan |

* cited by examiner

*Primary Examiner* — Hung X Dang
(74) *Attorney, Agent, or Firm* — Cramer Patent & Design, PLLC.; Aaron R. Cramer

(57) ABSTRACT

Eyewear includes a pair of eyeglass frames and lenses. Portions of the frame have an interior void filled with a cooling medium. Regions of the frame intended for skin contact further comprise a thermally conductive material while regions of the frame opposite the thermally conductive material further comprise an insulative material.

14 Claims, 5 Drawing Sheets

EYEWEAR WITH COOLING FRAME

FIELD OF THE INVENTION

The present invention relates generally to the field of eyewear with cooling frame.

BACKGROUND OF THE INVENTION

Those of us who work and/or play outside in the summer months know what a burden the heat is. Such people must constantly worry about heat stroke, heat exhaustion and other types of heat illnesses, as they are common occurrences in hot weather. This heat buildup is often complicated when the user must wear glasses as a piece of safety gear, as a necessity to see, to keep the sun out of their eyes, or as a piece of protective equipment as required by a sporting or recreation activity.

Not only must the user deal with heat, but also with the sweat that runs down from the forehead and possibly into their eyes. Even the healthiest of worker can succumb to heat illness if he or she ignores the warning signs. Productivity and safety can be compromised as well. Accordingly, there exists a need for a means by which individuals who must wear glasses and be exposed to high heat conditions can be kept cool in an effort to address the issues described above. The development of the eyewear with integral cooling ability 10 fulfills this need.

SUMMARY OF THE INVENTION

The principles of the present invention provide for a unit of eyewear comprising a rim having an interior side and an exterior side. The eyewear utilizes a pair of lenses within the rim to suit liking of a wearer. Each of the pair of lenses include an interior side and an exterior side of the lenses. The interior side and the exterior side of the lenses are treated with a hydrophobic coating. The eyewear also comprises a bridge having an interior side and an exterior side and a plurality of temples having an interior side and an exterior side. The interior side and the exterior side of each the temple is made of thermally conductive material. Additionally, the thermally insulative material is bulged outward to produce a hollow interstitial space the temples of the eyewear are folded about a pair of hinges in a common manner to produce a compact state.

The eyewear may be placed in a cold environment to obtain a cold temperature prior to being worn by the wearer. The eyewear may be worn by the wearer to transfer the cold temperature to the wearer's head through the temples via the thermally conductive material to produce a cooling effect. The cold temperature is transferred to a wearer's face through the rim of the eyewear via the thermally conductive material to produce a cooling effect. The lenses may be selected from the group consisting of prescription lenses, tinted lenses, gradient lenses, polarized lenses, or impact resistant lenses.

The hydrophobic coating comprises a range of 20 nms to 30 nms layer of nanocrystal-line transparent coating of titanium dioxide. The rim, the bridge, and the temples are made of metal or a metal alloy made with graphene. The rim, the bridge, and the temples may be made of a thermally insulative material selected from the group consisting of plastic, fiberglass, and wood.

The interstitial space may be filled with a thermal storage medium selected from the group consisting of water, hydroxyethyl cellulose, sodium polyacrylate, and vinyl-coated silica gel. The eyewear may be form-fitting and thus provides an increased level of contact with the wearer's face, eye area and sides of the head when compared to other forms of eyewear. The eyewear may provide the rim and the pair of temples with increased skin contact area and an increased profile for thermal retention. The eyewear may be stored in a storage case which is insulated to enhance the thermal properties of the eyewear by preservation. The hydrophobic coating reduces a buildup of water or condensation which readily develops during an initial thermal transition phase of use.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
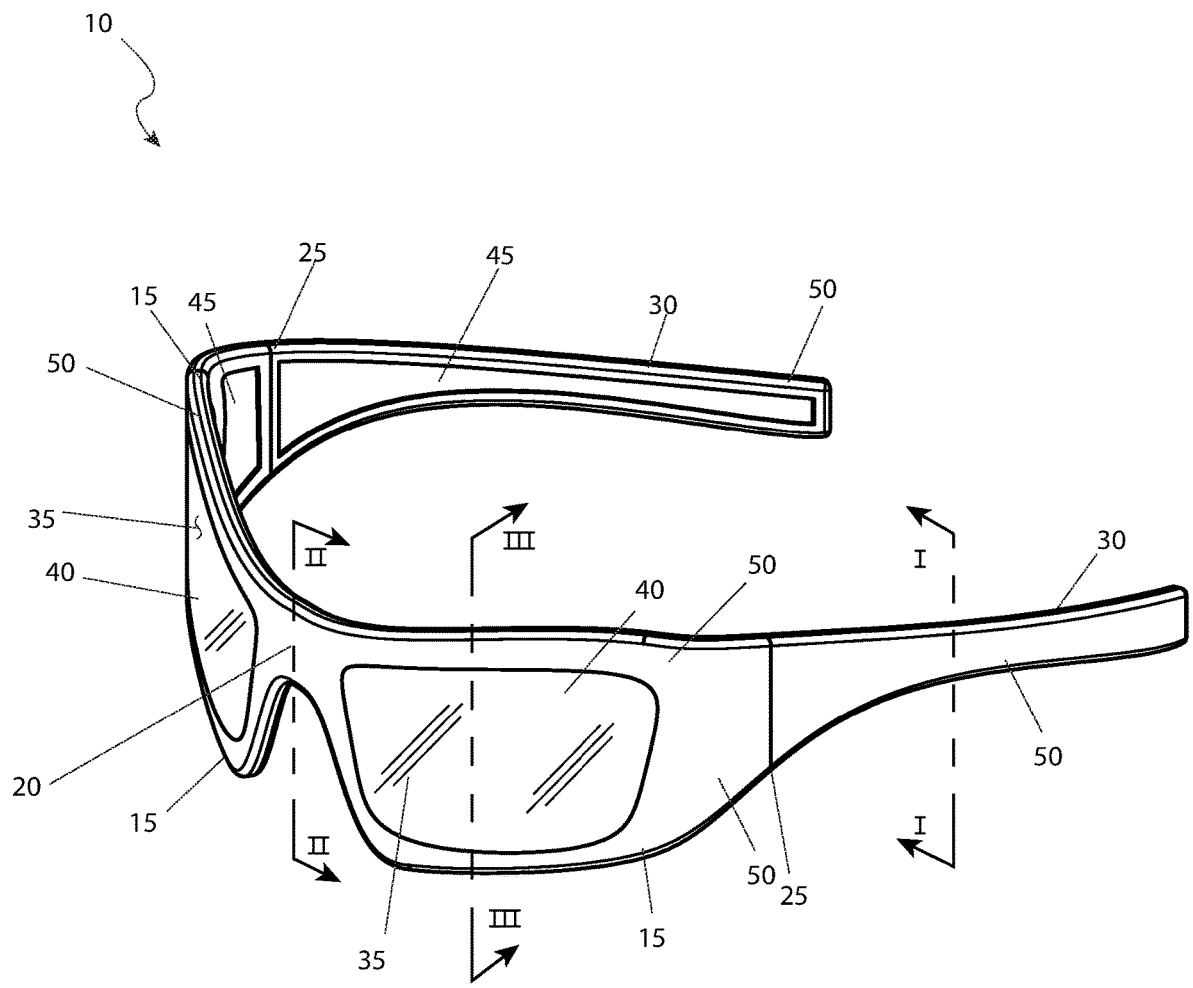
FIG. 1 is a perspective view of the eyewear 10, according to the preferred embodiment of the present invention.

10 eyewear
15 rim
20 bridge
25 hinge
30 temple
35 lens
40 hydrophobic coating
45 thermally conductive material
50 thermally insulative material
55 interior side
60 exterior side
65 interstitial space
70 thermal storage medium
75 storage case
80 compact state
85 access opening
90 travel path "t"
95 lid

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of the eyewear 10 with integral cooling ability 10, according to the preferred embodiment of the present invention is disclosed. The eyewear 10 includes conventional components including, but not limited to: a rim 15, a bridge 20, hinges 25 and temples 30.

The eyewear 10 as depicted in FIG. 1 is that of form-fitting sports eye wear which provides two (2) advantages. First, said style of eyewear is form-fitting and thus provides an increased level of contact with the wearer's face, eye area and sides of the head when compared to other forms of eyewear. Second, said style of eyewear typically provides larger (wider) rim 15 and especially temples 30 and thus increase skin contact area and an increased profile for thermal retention. However, the teachings associated with the present invention can be adapted to a wide range and style of eyewear and the use of any style of eyewear is not intended to limit the present invention. The eyewear 10 may utilize lenses 35 within the rim 15 to suit the liking of the wearer. Various styles of lenses 35 such as prescription, tinted (sunglasses), gradient (sunglasses), polarized (sunglasses), impact resistant (safety glasses) or similar may be utilized. Both the interior and exterior surfaces of the lenses 35 may be treated with a hydrophobic coating 40 such as a 20-30 nm layer of nanocrystal-line transparent coating of titanium dioxide (chemical formula TiO2). The hydrophobic coating 40 reduces the buildup of water or condensation which may readily develop during the initial thermal transition phase of use. The interior (facing/contacting the wearer) components of the eyewear 10, primarily the rim 15, the bridge 20, and the temples 30, would be manufactured of a thermally conductive material 45 such as a metal, metal alloy made with graphene, or the like. The exterior (outward facing) components of the eyewear 10, primarily the rim 15, the bridge 20, and the temples 30, would be manufactured of a thermally insulative material 50, such as plastic, fiberglass, wood, or the like. The use of any particular type of thermally conductive material 45 or thermally insulative material 50 is not intended to be a limiting factor of the present invention. Finally, in addition to the eyewear 10 being made available in a wide variety of styles as aforementioned described, the eyewear 10 would also be made available in multiple colors and sizes to suit male and female wearers of all ages.

Figure 2:
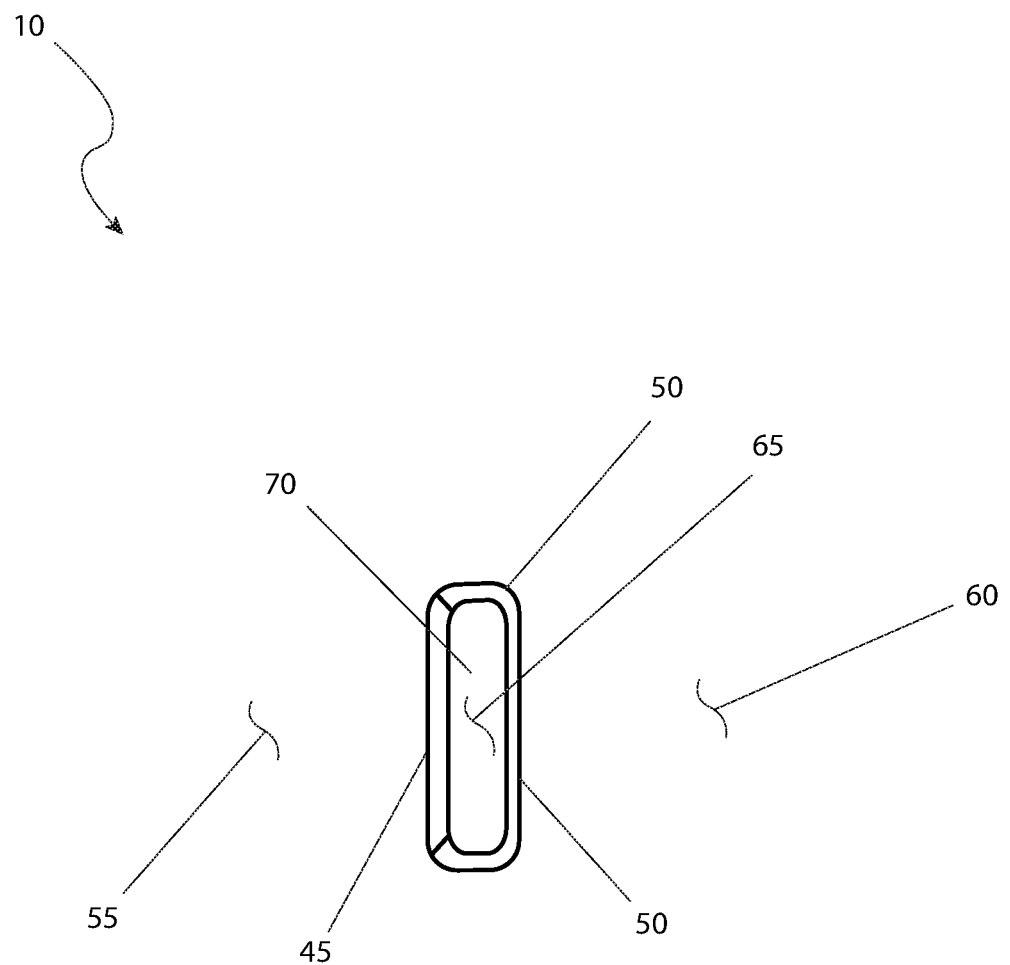
FIG. 2 is a sectional view of the eyewear 10, as seen along a line I-I, as shown in FIG. 1, according to the preferred embodiment of the present invention.

Referring next to FIG. 2, a sectional view of the eyewear 10, as seen along a line I-I, as shown in FIG. 1, according to the preferred embodiment of the present invention is depicted. This view illustrates one (1) of the two (2) temples 30, with an interior side 55 (toward the wearer's head) and an exterior side 60 (outwardly visible). The interior side 55 of each temple 30 is manufactured of the thermally conductive material 45, while the exterior side 60 of each temple 30 is manufactured of a thermally insulative material 50. The thermally insulative material 50 is bulged outward to produce a hollow interstitial space 65 as shown. The interstitial space 65 is filled with a thermal storage medium 70 such as water, or water with various additives including but not limited to hydroxyethyl cellulose (Cellusize), sodium polyacrylate, vinyl-coated silica gel, or the like. Prior to being worn by the user, the eyewear 10 would be placed in a cold environment such as a freezer to allow the thermal storage medium 70 to obtain a relatively cold temperature. Then, during wearing by the user, the cold temperature would be transferred to the wearer's head through the temples 30 of the eyewear 10 via the thermally conductive material 45, to produce a cooling effect.

Figure 3:
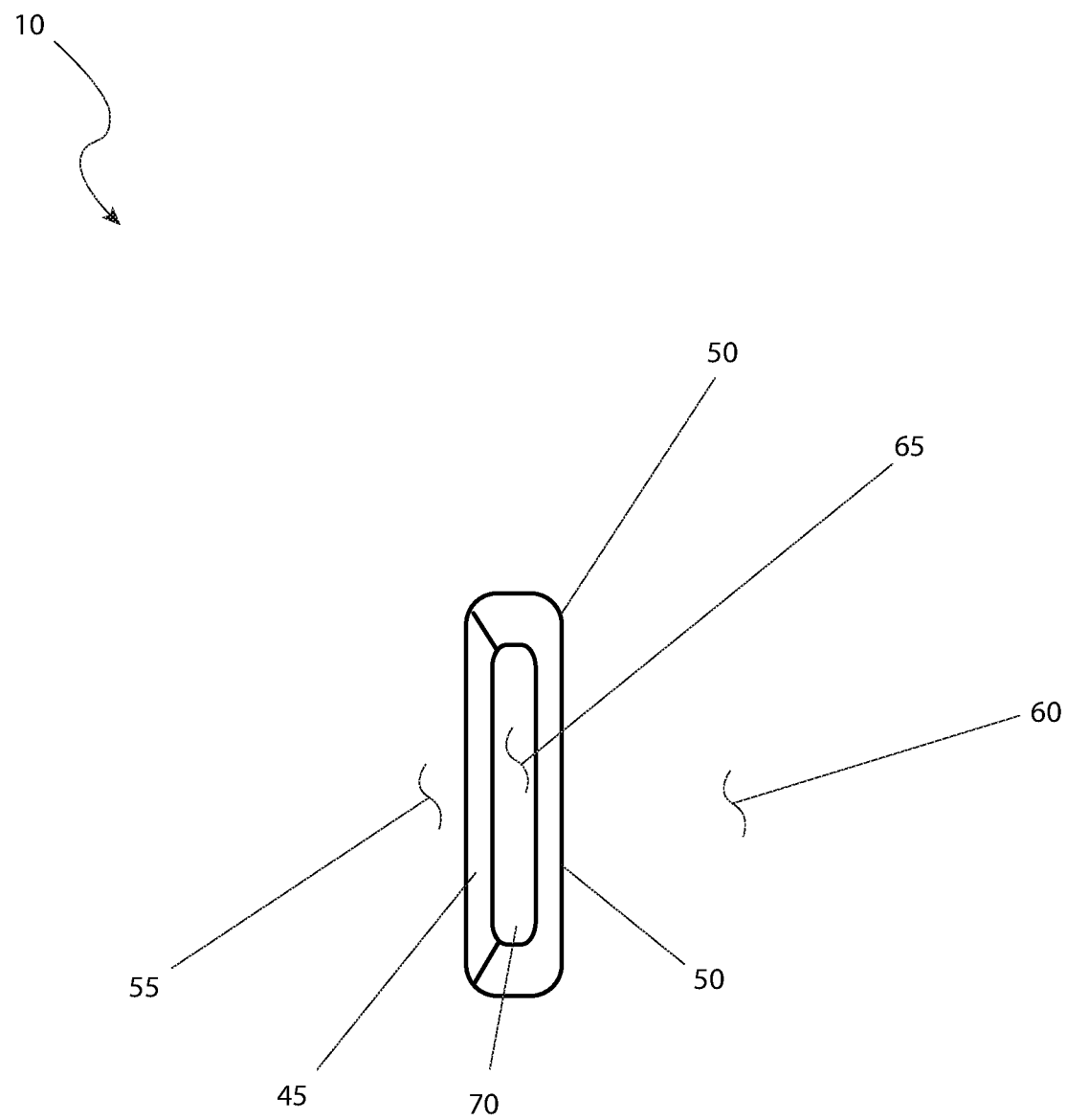
FIG. 3 is a sectional view of the eyewear 10, as seen along a line II-II, as shown in FIG. 1, according to the preferred embodiment of the present invention.

Referring now to FIG. 3, a sectional view of the eyewear 10, as seen along a line II-II, as shown in FIG. 1, according to the preferred embodiment of the present invention is shown. This view illustrates the bridge 20, with the interior side 55 (toward the wearer's nose area) and an exterior side 60 (outwardly visible). The interior side 55 of the bridge 20 is manufactured of the thermally conductive material 45, while the exterior side 60 of the bridge 20 is manufactured of a thermally insulative material 50. The thermally insulative material 50 is bulged outward to produce the hollow interstitial space 65 as shown. As mentioned above, the interstitial space 65 is filled with the thermal storage medium 70 and placed in a cold environment such as a freezer to allow the thermal storage medium 70 to obtain a relatively cold temperature. Then, during wearing by the user, the cold temperature would be transferred to the wearer's nose through the bridge 20 of the eyewear 10 via the thermally conductive material 45, to produce a cooling effect.

Figure 4:
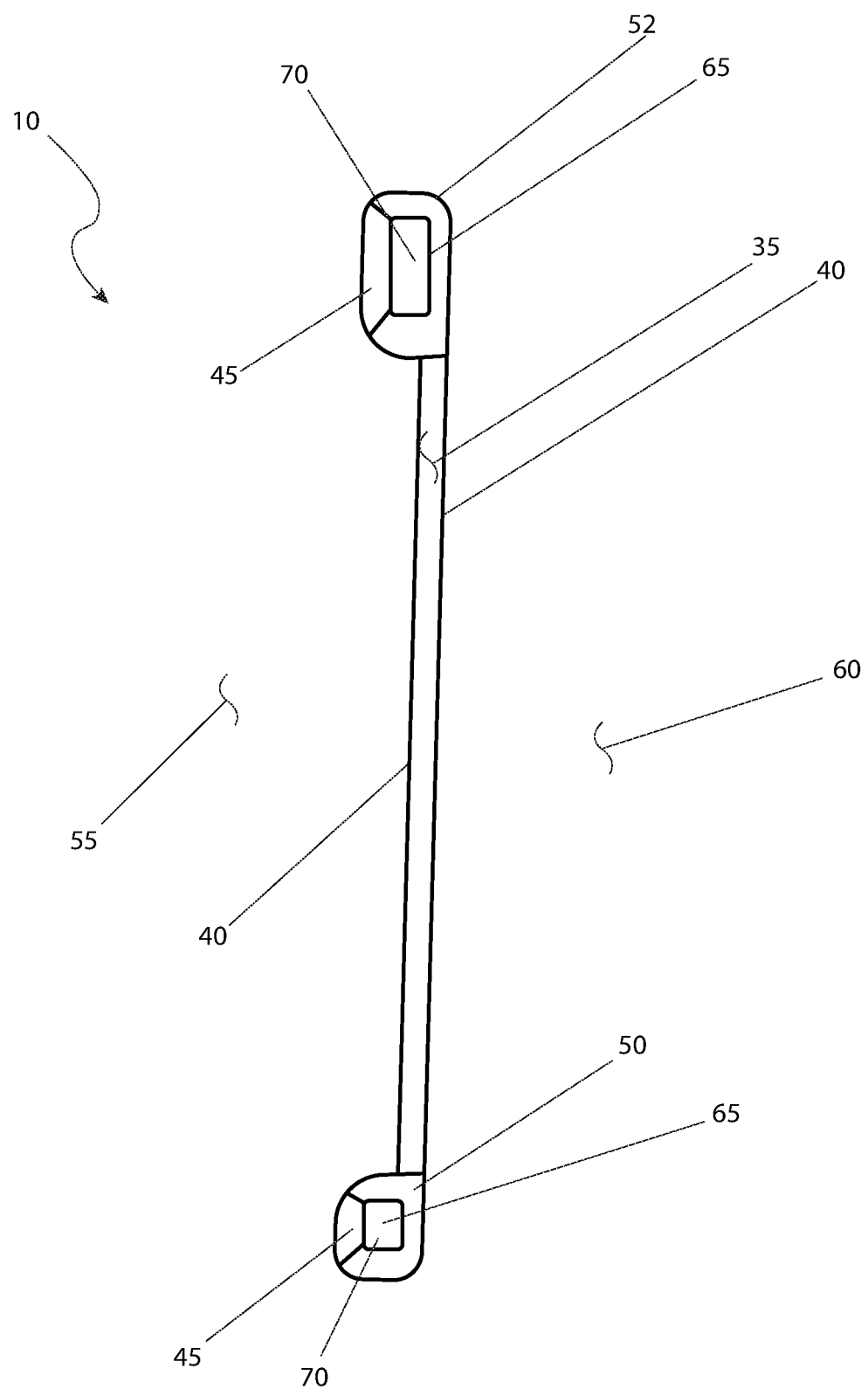
FIG. 4 is a sectional view of the eyewear 10, as seen along a line III-III, as shown in FIG. 1, according to the preferred embodiment of the present invention; and, FIG. 5 is a perspective view of the eyewear 10, in a state of being stored in a storage case 75, according to the preferred embodiment of the present invention.

Referring next to FIG. 4, a sectional view of the eyewear 10, as seen along a line III-III, as shown in FIG. 1, according to the preferred embodiment of the present invention is disclosed. This view illustrates the rim 15, with the interior side 55 (toward the wearer's face) and an exterior side 60 (outwardly visible). The interior side 55 of the rim 15 is manufactured of the thermally conductive material 45, while the exterior side 60 of the rim 15 is manufactured of a thermally insulative material 50. The thermally insulative material 50 is bulged outward to produce the hollow interstitial space 65 as shown. As mentioned above, the interstitial space 65 is filled with the thermal storage medium 70 and placed in a cold environment such as a freezer to allow the thermal storage medium 70 to obtain a relatively cold temperature. Then, during wearing by the user, the cold temperature would be transferred to the wearer's face through the rim 15 of the eyewear 10 via the thermally conductive material 45, to produce a cooling effect. Also visible is an individual lens 35 along with the hydrophobic coating 40 on both side of the lens 35.

Figure 5:
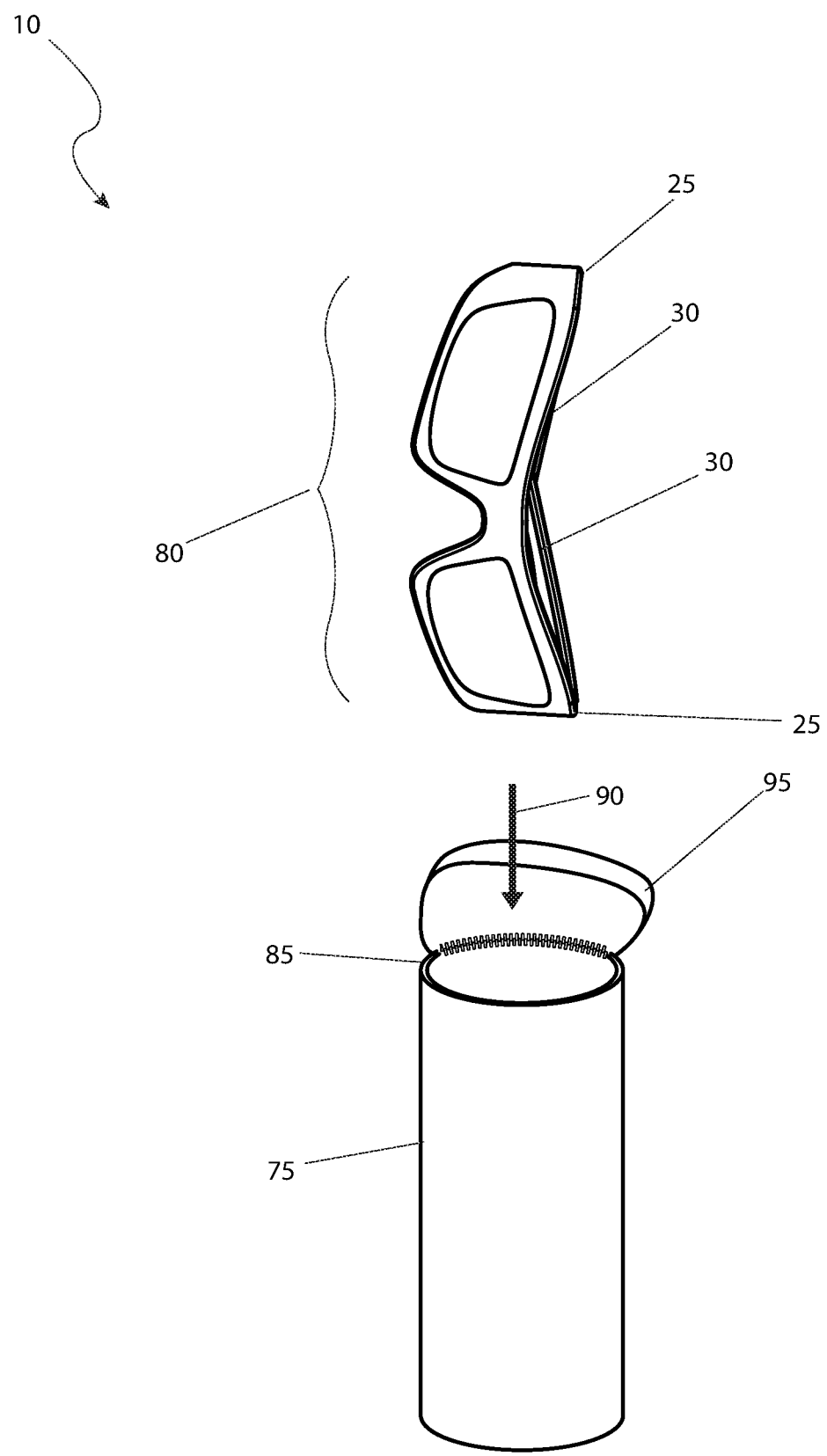

Referring finally to FIG. 5, a perspective view of the eyewear 10, in a state of being stored in a storage case 75, according to the preferred embodiment of the present invention. The temples 30 of the eyewear 10 are folded about the hinges 25 in a common manner to produce a compact state 80. The eyewear 10 is then inserted into an access opening 85 of the storage case 75 along a travel path "t" 90. The storage case 75 may be insulated to enhance the thermal properties of the eyewear 10 by preservation. When removed from the cold environment such as a freezer, the storage case 75 will delay loss of cooling properties by isolating the eyewear 10 form any warm environment. These properties are viewed as being valuable when usage is delayed such as while traveling to a remote location (beach, warm work environment, or the like) or when using multiple eyewear 10 on a rotating basis. The storage case 75 is provided with a lid 95 to aid in insulating properties. The storage case 75 as depicted in FIG. 5 is that of a cylindrical shape, approximately the same as a beverage can to facilitate storage in a cooler with other beverage cans. However, the overall size, shape, configuration, and composition of the storage case 75 may vary provided physical and/or thermal conservation is provided. As such, the presentation of the storage case 75 as shown in FIG. 5 is not intended to be a limiting factor of the present invention.

2. Operation of the Preferred Embodiment

The preferred embodiment of the present invention can be utilized by the common user in a simple and effortless manner with little or no training. It is envisioned that the eyewear 10 would be constructed in general accordance with FIG. 1 through FIG. 5. The user would procure the eyewear 10 through normal procurement channels. Particular attention would be paid to various design elements of the eyewear 10 such as style, size, color, lens material and the like so that they suit the needs of the specific application as well as the personal tastes of the user.

After procurement and prior to utilization, the eyewear 10 would be prepared in the following manner: the temples 30 would be folded along the hinges 25 to place the eyewear 10 in a compact state 80; the eyewear 10 would be placed in the storage case 75; and the storage case 75 would then be placed in a cold location such as a food freezer or cooler.

During utilization of the eyewear 10, the following procedure would be initiated: at a point in time that the user wishes to be provided with a cooling effect about their face and head, the user would remove the eyewear 10 from the storage case 75; open the temples 30 and place them upon their head following the same practice as a conventional pair of glasses. The cooling effect as stored by the thermal storage medium 70 transfers through the thermally conductive material 45 on the interior side 55 of the rim 15, the bridge 20, and the temples 30 to cool the user. Such a cooling effect is envisioned to last approximately fifteen to thirty minutes (15-30 min.) dependent on the ambient temperature. Such cooling effect is envisioned to be beneficial during hot temperatures, strenuous activities, as an aid to treat illness or injury about the heat, reduce the effect of a hangover, when worn with a hardhat or other personal protective equipment (PPE) at a work environment or the like. The eyewear 10 may be worn as conventional eyewear at any time without enjoying the benefit of the cooling. Additionally, it is envisioned that multiple pairs of eyewear 10 could be utilized with one (1) pair of eyewear 10 being worn, while another pair is in a cold environment such as a freezer, and then rotated so that the user can enjoy the cooling effect on a continuous basis.

After use of the eyewear 10, it is simply removed, cleaned if necessary, and then placed back in the storage case 75 and then placed in a cold environment whereupon it can be used again on a continuous rotating basis.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An eyewear, comprising:
a rim having an interior side and an exterior side, said eyewear utilize a pair of lenses within said rim to suit liking of a wearer, each of said pair of lenses include an interior side and an exterior side of said lenses, said interior side and said exterior side of said lenses are treated with a hydrophobic coating;
a bridge having an interior side and an exterior side; and
a plurality of temples having an interior side and an exterior side, said interior side and said exterior side of each said temple is made of thermally conductive material and thermally insulative material wherein, said thermally insulative material is bulged outward to produce a hollow interstitial space said temples of said eyewear are folded about a pair of hinges in a common manner to produce a compact state.

2. The eyewear, according to claim 1, wherein said eyewear is placed in a cold environment to obtain a cold temperature prior to being worn by said wearer.

3. The eyewear, according to claim 2, wherein said eyewear is worn by said wearer to transfer said cold temperature to said wearer's head through said temples via said thermally conductive material to produce a cooling effect.

4. The eyewear, according to claim 2, wherein said cold temperature is transferred to a wearer's face through said rim of said eyewear via said thermally conductive material to produce a cooling effect.

5. The eyewear, according to claim 1, wherein said lenses are selected from the group consisting of prescription lenses, tinted lenses, gradient lenses, polarized lenses, or impact resistant lenses.

6. The eyewear, according to claim 1, wherein said hydrophobic coating is in the range of 20 nms to 30 nms layer of nanocrystal-line transparent coating of titanium dioxide.

7. The eyewear, according to claim 1, wherein said rim, said bridge, and said temples are made of metal.

8. The eyewear, according to claim 1, wherein said rim, said bridge, and said temples are made of a metal alloy made with graphene.

9. The eyewear, according to claim 1, wherein said rim, said bridge, and said temples are made of a thermally insulative material selected from the group consisting of plastic, fiberglass, and wood.

10. The eyewear, according to claim 1, wherein said interstitial space is filled with a thermal storage medium selected from the group consisting of water, hydroxyethyl cellulose, sodium polyacrylate, and vinyl-coated silica gel.

11. The eyewear, according to claim 1, wherein said eyewear is form-fitting and thus provides an increased level of contact with said wearer's face, eye area and sides of said head when compared to other forms of eyewear.

12. The eyewear, according to claim 1, wherein said eyewear provides said rim and said pair of temples with increased skin contact area and an increased profile for thermal retention.

13. The eyewear, according to claim 1, wherein said eyewear is stored in a storage case is insulated to enhance said thermal properties of said eyewear by preservation.

14. The eyewear, according to claim 1, wherein said hydrophobic coating reduces a buildup of water or condensation which readily develops during an initial thermal transition phase of use.

* * * * *